United States Patent [19]
Jian

[11] Patent Number: 5,979,191
[45] Date of Patent: Nov. 9, 1999

[54] METHOD AND APPARATUS FOR MELTING OF GLASS BATCH MATERIALS

[75] Inventor: Christopher Q. Jian, Westerville, Ohio

[73] Assignee: Owens Corning Fiberglas Technology, Inc., Summit, Ill.

[21] Appl. No.: 08/867,091

[22] Filed: Jun. 2, 1997

[51] Int. Cl.[6] ............................................. C03B 37/07
[52] U.S. Cl. ..................... 65/490; 65/29.15; 65/29.17; 65/29.19; 65/29.21; 65/160; 65/161; 65/162; 65/335; 65/347; 65/502; 432/95; 432/97; 432/99; 432/100
[58] Field of Search .................................. 65/29.17, 160, 65/161, 162, 335, 347, 490, 502, 29.15, 29.19, 29.21; 432/95, 97, 99, 100

[56] References Cited

U.S. PATENT DOCUMENTS

| | | | |
|---|---|---|---|
| Re. 20,282 | 3/1937 | Bernarde | 324/100 |
| 1,371,084 | 3/1921 | Ferguson | 65/136.1 |
| 1,500,651 | 7/1924 | Smith | 432/210 |
| 1,756,381 | 4/1930 | Pahl | 239/85 |
| 1,769,181 | 7/1930 | Jackson | 65/454 |
| 1,964,915 | 7/1934 | Haswell | 432/58 |
| 2,006,947 | 7/1935 | Ferguson | 65/134.7 |
| 2,038,251 | 4/1936 | Vogt | 75/342 |
| 2,131,599 | 9/1938 | Shrum | 65/454 |
| 2,165,242 | 7/1939 | Drill | 432/97 |
| 2,178,059 | 10/1939 | Zier | 65/181 |
| 2,212,448 | 8/1940 | Modigliani | 65/454 |
| 2,268,546 | 1/1942 | Forter | 65/172 |
| 2,331,944 | 10/1943 | Von Pazsiczky et al. | 65/464 |
| 2,455,907 | 12/1948 | Slayter | 65/526 |
| 2,634,555 | 4/1953 | Henry et al. | 65/136.1 |
| 2,878,110 | 3/1959 | Altstaedt et al. | 48/203 |
| 2,958,161 | 11/1960 | Palmer | 432/13 |
| 3,077,094 | 2/1963 | Jack et al. | 65/135.8 |
| 3,172,648 | 3/1965 | Brichard | 432/5 |
| 3,185,554 | 5/1965 | Sweo et al. | 65/27 |
| 3,244,494 | 4/1966 | Apple et al. | 65/135.9 |
| 3,443,921 | 5/1969 | Boivent | 65/136.3 |
| 3,510,289 | 5/1970 | Boivent | 65/335 |
| 3,563,722 | 2/1971 | Troyankin et al. | 65/335 |
| 3,721,539 | 3/1973 | Hansford | 65/19 |
| 3,748,113 | 7/1973 | Ito | 65/335 |
| 4,185,984 | 1/1980 | Kiyonaga | 65/134.4 |
| 4,188,201 | 2/1980 | Jung | 65/302 |
| 4,342,582 | 8/1982 | Porter | 65/521 |
| 4,381,934 | 5/1983 | Kunkle et al. | 65/134.4 |
| 4,529,428 | 7/1985 | Groetzinger | 65/27 |
| 4,544,394 | 10/1985 | Hnat | 65/27 |
| 4,553,997 | 11/1985 | Hnat | 65/27 |
| 4,631,080 | 12/1986 | Westra et al. | 65/136.1 |
| 4,957,527 | 9/1990 | Hnat | 65/19 |
| 5,447,547 | 9/1995 | Goldfarb et al. | 65/134.1 |

OTHER PUBLICATIONS

Shigehiro Miyamae, Takashi Kiga, Shin–ichi Takano, Koji Omata and Naokazu Kimura, "Bench–Scale Testing on O2/CO2 Combustion For CO2 Recovery". Proceedings of AFRC/JFRC Pacific Rim International Conference on Environmental Control of Combustion Processes, Oct. 16–20, 1994, Maui, Hawaii.

(List continued on next page.)

*Primary Examiner*—Sean Vincent
*Attorney, Agent, or Firm*—Inger H. Eckert

[57] ABSTRACT

An apparatus for melting materials is provided comprising a melter body having a batch injection portion including a batch inlet port, a batch melting portion including a batch melting chamber adapted to receive materials from said batch injection portion, and a molten materials delivery portion including a molten materials outlet port. At least one jet stream injection assembly injects a jet stream into said batch melting chamber. The jet stream comprises a fuel, an oxidant, and heated products of combustion and produces a vortex flow pattern in said batch melting chamber. Fuel and oxidant within said vortex flow pattern react to form laminar flamelets within said vortex flow pattern. The heat generated in the flamelets melts the materials.

17 Claims, 6 Drawing Sheets

OTHER PUBLICATIONS

Curtis L. Taylor, "Development and commercialization of an advanced, Low–Emissions, Multi–Fuel Oxygen Burner". Proceedings of AFRC/JFRC Pacific Rim International Conference on Environmental Control of Combustion Processes, Oct. 16–20, 1994, Maui, Hawaii.

G. Heidarinejad & A.F. Ghonium, "Vortex simulation of the reacting shear layer; Effects of Reynolds and Damkohler Number", Jan. 9–12, 1989, Aerospace Sciences Meeting.

Boa–Teh Chu, "Research Memorandum—Stability of Systems Containing A Heat Source—The Rayleigh Criterion-"National Advisory Committee For Aeronautics, Jun. 26, 1956.

J.C. Lasheras, J.S. Cho and T. Maxworthy, "On the Origin and evolution of streamwise vortical structures in a plane, free shear layer"; J. Fluid Mech (1986), vol. 172, pp. 231–258 no month available.

Garry L. Brown and Anatol Roshko, "Ön density effects and large structure in trubulent mixing layers"; J. Fluid Mech. (1974), vol. 64, part 4, pp. 775–816. no month available.

Don Shamp and Doug Davies, "Oxygen Firing at Parkersburg"; American Glass Review, Dec. 1990, pp. 6–13.

R.L. Raun, M.W. Beckstead, "A Numberical Model For Temperature Gradient and Particle Effects on Rijke Burner Oscillations"; Combustion and Flame 94: 1–24 (1993) no month available.

METHOD AND APPARATUS FOR MELTING OF GLASS BATCH MATERIALS

TECHNICAL FIELD

This invention relates to an improved apparatus for melting glass batch materials and, more particularly, to a unit for the production of molten glass. The present invention is also applicable to other processes which involve the conversion of solid and/or slurry feed materials into a molten fluid.

BACKGROUND OF THE INVENTION

Glass melting has traditionally been accomplished in open-hearth type furnaces. In these traditional furnaces, pulverulent raw batch materials are distributed on top of a molten pool of glass to form a batch blanket. In gas fired furnaces, radiation from the furnace crown and combustion flames supply the energy required for heating and melting the batch materials. Although over the years numerous design and operating changes have been incorporated into these furnaces, there are still many deficiencies associated with these tank type glass furnaces. In modern tank type furnaces, the multiple subprocesses of continuous glass melting are expected to accomplished in a single pool of glass of which the physical dimensions are maintained constant. These subprocesses include distribution of raw batch materials to form a batch blanket and control of its movement, heating and melting the batch materials, dissolving silica grains, homogenizing the glass, and refining the glass to allow gaseous inclusions to be released from the melt. All these subprocesses have to be accomplished within a minimum glass residence time inside the furnace. However, the mechanisms involved in each of the subprocesses are not necessarily the most efficient, and some are not even compatible with each other. In order to produce an acceptable glass, the solution to the aforementioned deficiencies relies on having a large body of glass in the tank to provide sufficient time for the subprocesses to complete before the glass is delivered to the forming operations. This is a very costly way to produce glass because the construction and maintenance of the furnaces require an excessive amount of expensive materials, huge superstructures, and numerous labor-intensive auxiliary items which lead to high furnace capital, operating, and maintenance costs. Further, although the furnaces are extensively insulated, a significant amount of energy input is needed to maintain the pool of glass at desired temperatures due to furnace heat losses which results in high furnace operating costs.

Many attempts have been made throughout the history of glass making to overcome the deficiencies associated with open-hearth tank type furnaces. U.S. Pat. No. 4,553,997, issued to Hnat, and U.S. Pat. No. 3,748,113, issued to Ito, each teach a glass melting apparatus where glass batch materials and either heated combustion products or a fuel-air mixture are injected together into the interior of a melting chamber to form a swirling flow pattern for the production of molten glass. However, in each of these devices the effectiveness of the swirling flow, or vortex, on the batch heating and melting processes, is necessarily weakened by the inclusion of the batch materials in the vortex-forming flow of injected materials. Since the batch materials are injected with either the combustion products or the fuel-air mixture, the high shear forces in the vortex for enhanced energy and mass transfer, are not effectively utilized to promote batch heating and melting. U.S. Pat. No. 2,268,546, issued to Forter, describes a glass furnace wherein fuel and air for combustion are introduced into the furnace to form burning streams of fuel in the form of a vortex. Batch materials are introduced downstream of the vortex, as opposed to within the vortex. In this manner, the heated vortex is utilized to uniformly heat the batch blanket of a pool of molten glass moving beneath the vortex. This device does not take advantage of the turbulence of the vortex to heat the batch materials as they are introduced into the furnace. Rather, the vortex is merely used to uniformly heat the batch blanket of the pool of molten glass.

U.S. Pat. No. 4,957,527, issued to Hnat, describes an apparatus for heat processing batch materials wherein preheated air is utilized to create a well-stirred vortex flow pattern within the furnace. Fuel and batch materials are introduced into the furnace along the centerline of the preheater so as to pass through the vortex. Fuel is generated in a gasifier prior to being injected into the preheater. However, it is difficult to maintain efficient and adequate batch melting within the furnace because the temperature of the vortex is not elevated until the fuel reacts with the oxidant within the vortex. Further, the well-stirred flow pattern in the preheater does not have the mechanism to separate the heated batch from the products of combustion. As a consequence, the glass produced downstream of the preheater is expected to contain large amounts of seeds. For these reasons, the furnace described in U.S. Pat. No. 4,957,527 is used primarily for waste materials processing as opposed to glass melting operations.

U.S. Pat. No. 2,455,907, issued to Slayter, describes an apparatus for melting glass wherein gas burners are directed so as to create a swirling or cyclonic flame in a melting chamber. According to the Slayter patent, as the glass batch is discharged into the chamber, the finely divided particles are immediately impinged by the swirling flame and reduced to a molten state. However, the design of the Slayter patent is not conducive to glass production because the products of combustion exit the chamber with the molten glass, thereby entraining gas within the molten glass. Further, as the molten glass exits the melting chamber, it is deposited into a pool of molten glass, thereby creating surface discontinuities within the pool of molten glass and causing further gaseous inclusions within the molten glass.

Finally, regarding the teachings of the patent documents described above, each of the devices described therein utilize a vertically oriented batch melting chamber. The heated batch materials or molten glass that were separated from the products of combustion in these melting chambers (except U.S. Pat. Nos. 4,957,527 and 4,533,997 wherein all the materials are in a mixed state), are remixed with the products of combustion at the chamber exit. As a result, the glasses produced from these melting chambers tend to be foamy or seedy. The vertical orientation of the melting chamber is also problematic because of structural incompatibility with many glass production and refining assemblies, which are commonly oriented along a horizontal plane.

Accordingly, there is a need for an improved apparatus for melting batch materials wherein efficient and complete batch melting is accomplished, wherein the integrity of the molten glass is preserved, and which is compatible with existing production assemblies.

SUMMARY OF THE INVENTION

This need is met by the present invention wherein an apparatus for melting glass batch materials utilizes a batch melting chamber wherein a vortex flow pattern is produced by jet streams comprising a fuel, an oxidant, and heated products of combustion. Further, the apparatus of the present invention includes a horizontal, or slightly inclined, melting chamber. Finally, a jet stream injection assembly according to the present invention produces a chain of turbulent oxy-fuel vortices within the batch melting chamber.

In accordance with one embodiment of the present invention, an apparatus for melting batch materials is provided comprising: a melter body having a batch injection portion including a batch inlet port, a batch melting portion including a batch melting chamber adapted to receive batch materials from the batch injection portion, and a molten glass delivery portion including a molten glass outlet port; and, at least one jet stream injection assembly operative to inject a jet stream into the batch melting chamber. The jet stream comprises a fuel, an oxidant, and heated products of combustion. The jet stream produces a vortex flow pattern in the batch melting chamber. Fuel and oxidant within the vortex flow pattern react to form flamelets within the highly turbulent vortex flow pattern.

The batch injection portion may comprise a conical batch injection chamber and the batch inlet port may be positioned at generally the apex of the conical batch injection chamber. The batch melting chamber may comprise a substantially cylindrical batch melting chamber having at least one jet stream port formed in the substantially cylindrical batch melting chamber. The jet stream port may define an entry point for the injected jet stream and an outermost linear projection of an originating flow path of the injected jet stream may intersect a perpendicularly oriented diametric line of the batch melting chamber at a portion of the perpendicularly oriented diametric line spaced from an interior surface of the batch melting chamber. The batch melting chamber may have a longitudinal melting chamber axis inclined with respect to a horizontal plane.

The batch melting chamber may have a plurality of jet stream ports separated by a predetermined spacing along a direction parallel to the longitudinal melting chamber axis between each adjacent jet streams. The batch melting chamber may be characterized by a melting chamber interior surface diametric line and the predetermined spacing may be less than about twice the interior surface diametric line. Alternate jet stream ports may be positioned on opposite sides of the batch melting chamber.

The batch delivery portion of the melter body may comprise a restricted nozzle section adapted to receive products of the flamelet reactions. The batch melting chamber may be characterized by a melting chamber interior surface diametric line and an interior diametric line of the restricted nozzle may be about 0.3 to 0.7 times the interior surface diametric line. The restricted nozzle section may include a nozzle lip in the form of a truncated cone extending in the direction of the batch melting chamber and/or a cone shaped diverging section. An alternate embodiment for the restricted nozzle may be a converging cone section.

The molten glass delivery portion may include a molten glass level control device and/or a first molten glass cavity, a second molten glass cavity, and a submerged throat operative to transfer molten glass from the first molten glass cavity to the second molten glass cavity. The first molten glass cavity may be separated from the second molten glass cavity by a submerged glass throat.

The melter body may include at least one interior pressure monitoring probe and/or at least one thermocouple positioned to monitor one of the molten glass temperatures, the melter body refractory temperature, and a reaction product temperature.

In accordance with another embodiment of the present invention, an apparatus for melting batch materials is provided comprising: a melter body having (i) a batch injection portion including a batch inlet port, (ii) a batch melting portion including a batch melting chamber adapted to receive batch materials from the batch injection portion, and (iii) a molten glass delivery portion including a molten glass outlet port; and at least one jet stream injection assembly operative to inject a jet stream into the batch melting chamber. The jet stream comprises a fuel and an oxidant. The jet stream produces a vortex flow pattern about an axis of rotation within the batch melting chamber. The vortex flow pattern is operative to melt batch materials received in the batch melting chamber. The axis of rotation lies in a plane defining a boundary between an upper melter body portion and a lower melter body portion. The melter body is arranged to cause molten glass distributed about an interior surface of the batch melting chamber to flow from the upper melter body portion to the lower melter body portion.

The lower melter body portion may include a first molten glass cavity, a second molten glass cavity, and a submerged throat operative to transfer molten glass from the first molten glass cavity to the second molten glass cavity. The boundary defining plane may be inclined with respect to a horizontal reference plane.

In accordance with yet another embodiment of the present invention, a jet stream injection assembly is provided comprising: an injection assembly burner operative to produce heated products of combustion; a combustion chamber adapted to receive the products of combustion and defining a combustion product flow path extending from a combustion chamber inlet to a combustion chamber outlet; and a combustion product duct adapted to receive the products of combustion and extending from the combustion chamber outlet. The combustion product duct includes a jet stream outlet and a secondary fuel supply inlet positioned between the combustion chamber outlet and the jet stream outlet. The combustion chamber includes (i) a divergent combustion chamber portion positioned along the combustion product flow path between the combustion chamber inlet and a straight combustion chamber portion, (ii) a straight combustion chamber portion which connects the divergent combustion chamber portion and the convergent combustion chamber portion, and (iii) a convergent combustion chamber portion positioned along the combustion product flow path between the straight combustion chamber portion and the combustion chamber outlet.

The injection assembly burner preferably comprises a primary oxidant supply and a primary fuel supply which are operative to introduce an excess of oxidant over the stoichiometric requirement for oxy-fuel firing. The primary oxidant supply and the primary fuel supply are configured such that the excess of oxidant is distributed adjacent the interior walls of the injection assembly burner. The excess of oxidant may comprise at least four times the amount of oxidant over the stoichiometric requirement for oxy-fuel firing. The injection assembly burner preferably provides a distribution of oxygen and natural gas wherein the distribution of oxygen and natural gas is established such that approximately 10 parts of natural gas are introduced into the combustion chamber by the injection assembly burner and approximately 90 parts natural gas are introduced into the combustion product duct by the secondary fuel supply inlet.

In accordance with yet another embodiment of the present invention, an apparatus for melting batch materials is provided comprising: a melter body having a batch injection portion including a batch inlet port, a batch melting portion including a batch melting chamber adapted to receive batch materials from the batch injection portion, and a molten glass delivery portion including a molten glass outlet port; and at least one jet stream injection assembly operative to inject a jet stream into the batch melting chamber. The jet stream produces a vortex flow pattern in the batch melting chamber. Fuel and oxidant within the vortex flow pattern react to form flamelets within the vortex flow pattern. The jet stream injection assembly includes: an injection assembly burner operative to produce heated oxidant and products of combustion; a combustion chamber adapted to receive the products of combustion and defining a combustion product flow path extending from a combustion chamber inlet to a combustion chamber outlet; and a combustion product duct extending from the combustion chamber outlet. The combustion product duct includes a jet stream outlet and a secondary fuel supply inlet positioned between the combustion chamber outlet and the heated jet stream outlet. The combustion chamber includes a divergent combustion chamber portion positioned along the combustion product flow path between the combustion chamber inlet and a straight combustion chamber portion, and a convergent combustion chamber portion positioned along the combustion product flow path between the straight combustion chamber portion and the combustion chamber outlet.

Accordingly, it is an object of the present invention to provide an apparatus for melting batch materials which efficiently and substantially completely melts batch materials into a molten glass, preserves the purity of molten glass, and is compatible with existing production assemblies.

DETAILED DESCRIPTION OF THE INVENTION

Figure 1:
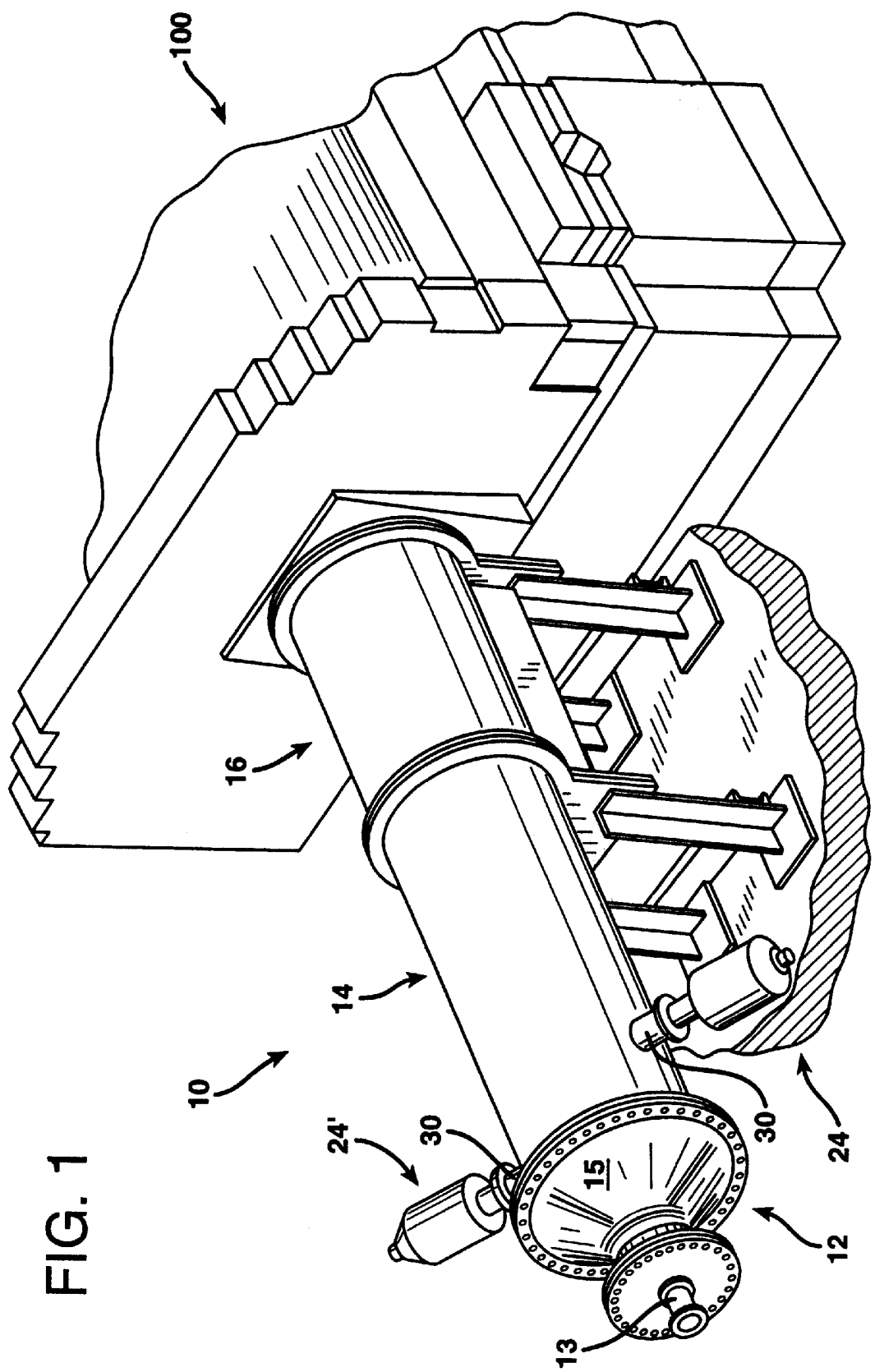
FIG. 1 is a perspective view of an apparatus for melting batch materials according to one embodiment of the present invention.

Referring to FIGS. 1–4, an apparatus for melting batch materials according to one embodiment of the present invention comprises a melter body 10 having a batch injection portion 12, a batch melting portion 14, and a molten glass delivery portion 16. The batch melting portion 14 includes a batch melting chamber 18 adapted to receive batch materials 15 from the batch injection portion 12. The molten glass delivery portion 16 includes a molten glass outlet port 22, a molten glass drain port 23, and a delivery weir 21. Molten glass 20 may be supplied to downline refining stations, such as a glass production furnace 100, shown in FIG. 1, or other downstream receiving structures by coupling the downstream structures or stations to the outlet port 22 or positioning the downstream structures or stations such that they receive molten glass 20 flowing over the delivery weir 21. The molten glass drain port 23 is utilized during start up and shut down operations to monitor the production of molten glass 20 and drain the system following shut down. The molten glass outlet port 22 and drain port 23 are plugged, as illustrated, when not in use.

Figure 5:
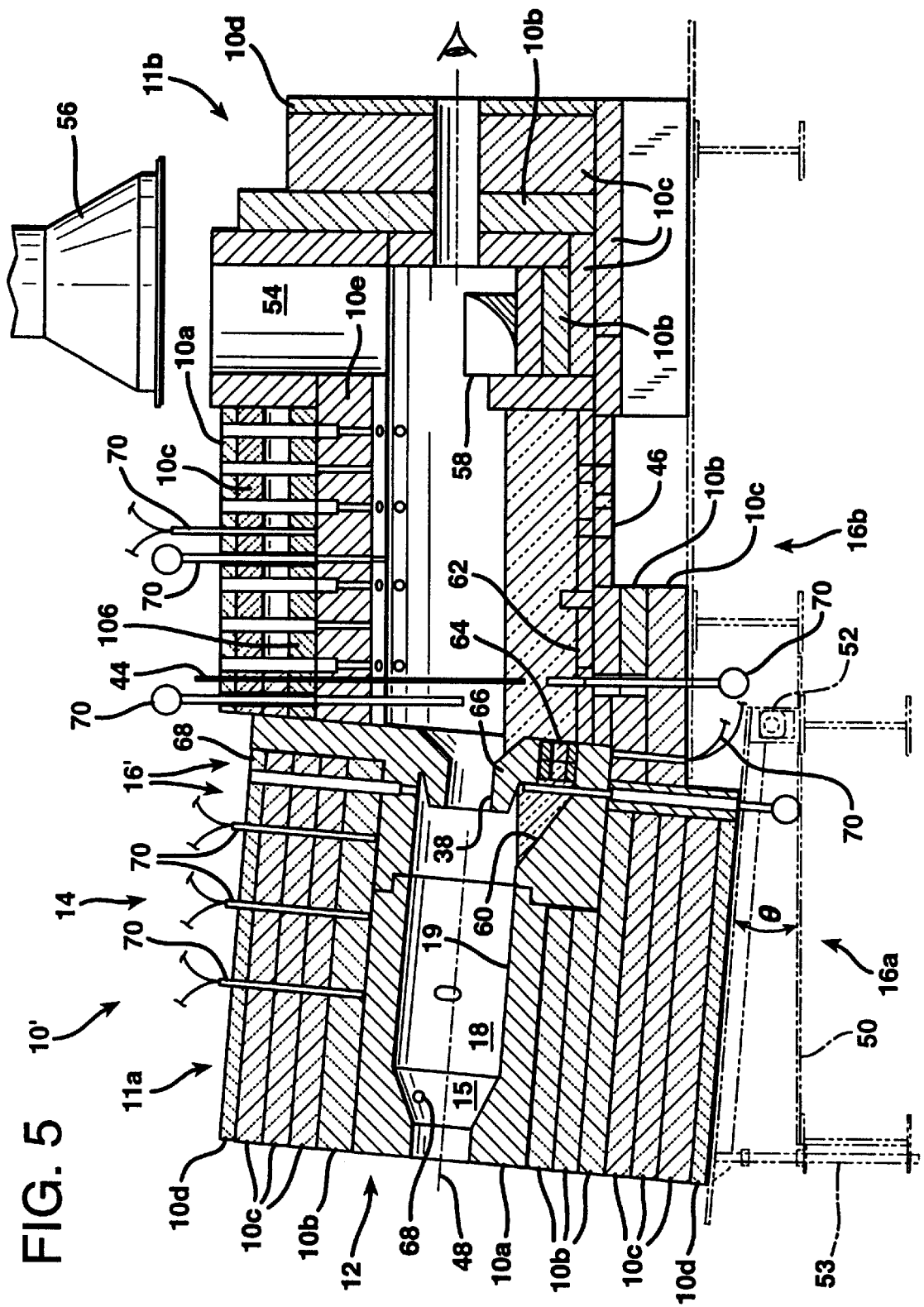
FIG. 5 is a cross sectional view of an apparatus for melting batch materials according to another embodiment of the present invention.

The batch injection portion 12 includes a batch inlet port 13 and a conical batch injection chamber 15. The batch inlet port 13 is positioned generally at the apex of the conical batch injection chamber 15 and is coupled to a pneumatic batch injection device (not shown) which is adapted to introduce batch materials at velocities on the order of about 20 to about 60 ft/sec (6.1 to 18.3 m/sec). The chamber 15 has a full cone angle on the order of about 50° to about 130° and functions to provide a batch preheating zone and to distribute the batch uniformly into the batch melting chamber 18. FIG. 5, described in further detail below, illustrates an embodiment of the present invention wherein the batch melting chamber 18 has a longitudinal melting chamber axis 48 which is inclined with respect to a horizontal plane 50. It is contemplated by the present invention that the batch melting chamber 18 illustrated in FIG. 1 may be similarly inclined. In the FIG. 5 embodiment, the angle of inclination θ of a first section 11a of the melter body 10 including the batch melting chamber 18 relative to the plane 50 is preferably less than about 30°.

Figure 2:
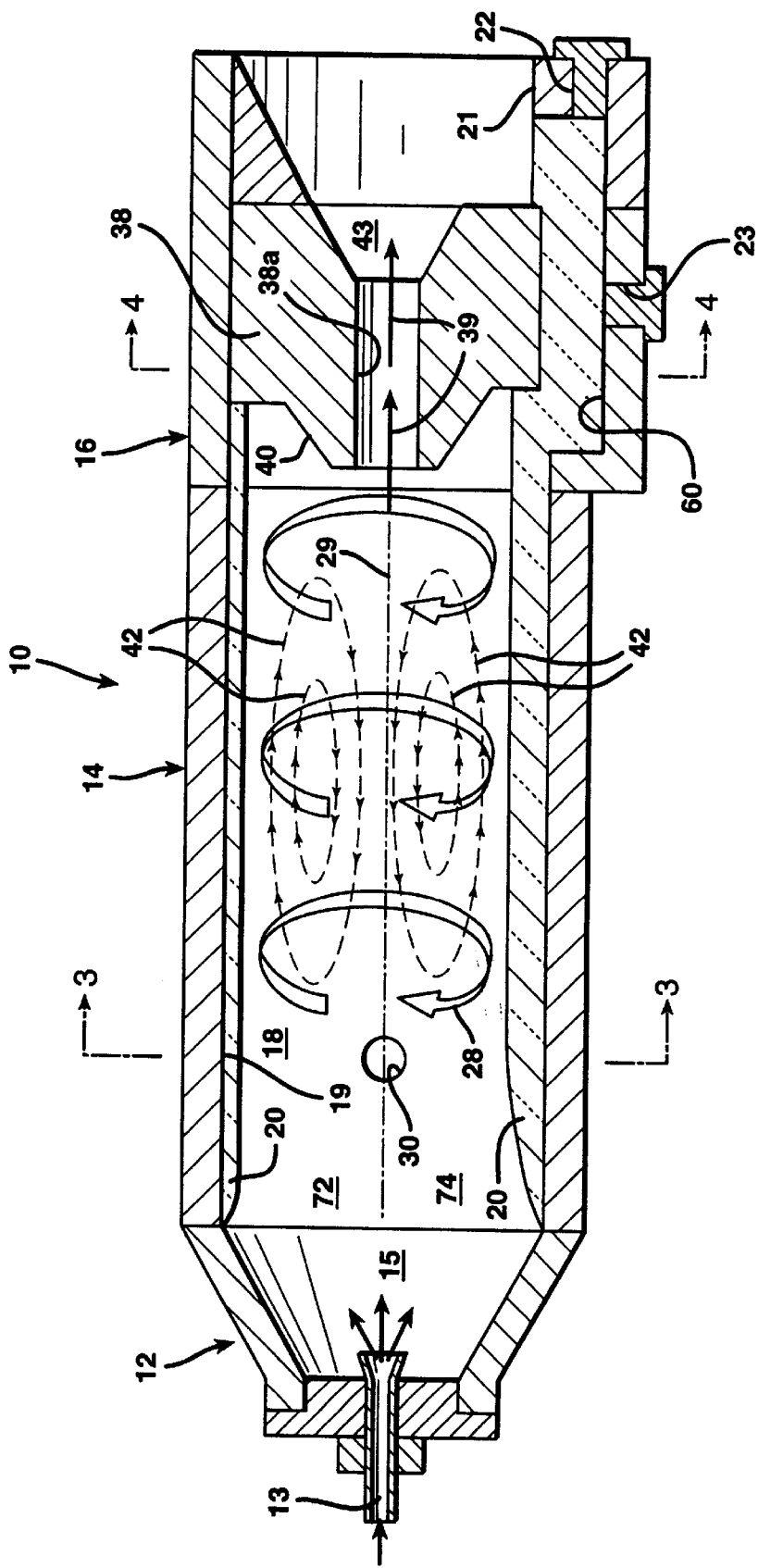
FIG. 2 is a cross sectional view of a portion of the apparatus illustrated in FIG. 1.
Figure 3:
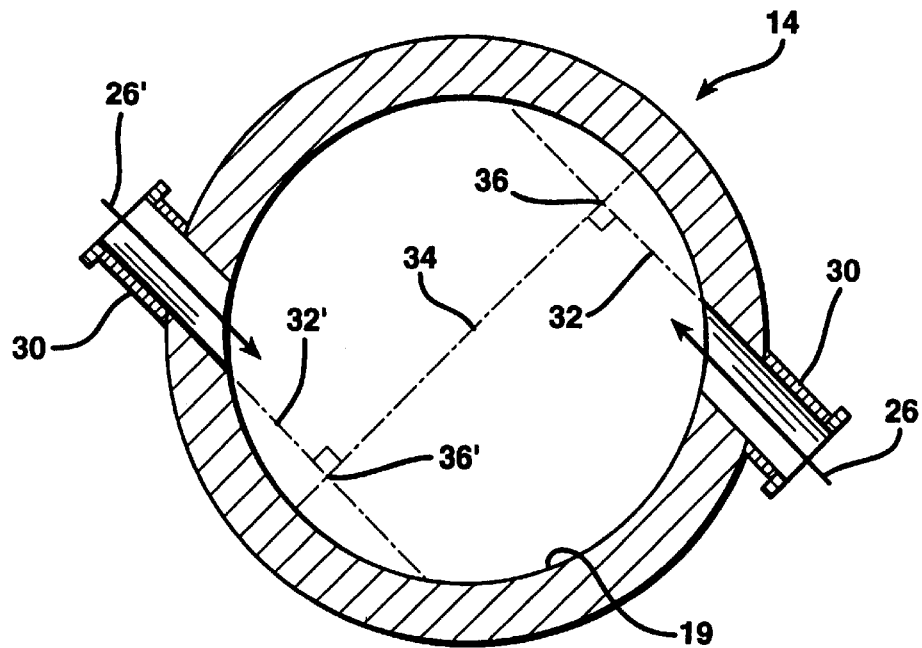
FIG. 3 is an immediate cross sectional view taken along line 3—3 of FIG. 2.
Figure 4:
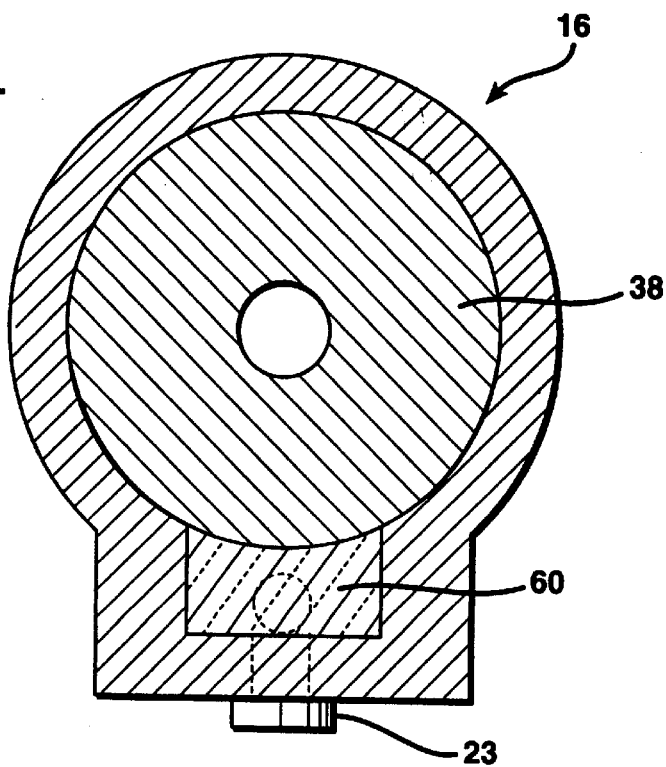
FIG. 4 is a cross sectional view taken along line 4—4 of FIG. 2.

A first jet stream injection assembly 24, see FIG. 1, is operative to inject a first jet stream, schematically illustrated by arrow 26 in FIG. 3, into the batch melting chamber 18. The first jet stream 26 comprises a fuel, an oxidant, and heated products of combustion which functions as an ignition source and provides a source of oxidant for the combustion of the fuel within the batch melting chamber 18. Further, the jet stream 26 provides the angular momentum for the generation of a vortex flow pattern 28 inside the batch melting chamber 18. Similarly, a second jet stream injection assembly 24' is operative to inject a second jet stream, schematically illustrated by arrow 26' in FIG. 3, into the batch melting chamber 18. The second jet stream 26' also comprises a fuel, an oxidant, and heated products of combustion and, together with the first jet stream 26, produces the vortex flow pattern 28 in the batch melting chamber 18, see FIG. 2. The vortex flow pattern 28 comprises a plurality of vortices forming a vortex flow pattern. Fuel and oxidant within the vortex flow pattern 28 react to form flamelets (not shown) due to high intensity turbulence generated by the vortex flow pattern 28. The batch materials are injected into and become mixed in this vortex flow pattern 28. The batch materials, once mixed in the flow pattern 28, are heated by the flamelets to their melting points via convection and radiation heat transfer. Flamelets, as utilized in the present specification and claims, are defined as small-scale eddies containing laminar flames due to the reaction of a fuel with an oxidant. The temperature of the flamelets can be on the order of about 3500° F. to about 5000° F. (1900–2800° C.), depending upon the type of fuel and oxidant used as well as their initial conditions. An oxidant, as utilized in the present specification and claims, is defined as any compound or mixture of materials that provides oxygen for combustion, e.g., substantially pure oxygen, air, etc.

Batch mixing, heating, and melting occurs in the batch melting chamber 18 at reduced temperatures because the batch materials are introduced directly into the vortex flow pattern 28. Hence, the high temperature combustion zone in the flow pattern 28 is substantially quenched by the batch materials resulting in a combustion zone of lower temperatures. In the combustion processes of fossil fuels, the generation of nitrogen oxides is primarily controlled by the reaction zone temperature and stoichiometry. The commonly known sources for nitrogen oxides are the thermal NOx, prompt NOx, and fuel NOx. The first two NOx production mechanisms are highly dependent of the reaction zone temperature, while the last one depends on both the temperature and stoichiometry. The thermal energy required for rapid batch heating and melting reduces the reaction zone temperature of the vortex flow pattern 28 on the order of 15% to 25%. The resulting lower reaction zone temperatures in the combustion zone contribute significantly to the suppression of the formation of nitrogen oxides within the batch melting chamber 18. This in-process NOx control mechanism significantly improves the environmental performance of the present glass melting apparatus.

To facilitate formation of the vortex flow pattern 28, the batch melting chamber 18 is substantially cylindrical in shape and has one or more jet stream ports 30 formed therein. Each jet stream port 30 defines the location and angle of entry of a respectively injected jet stream 26, 26'. As is schematically illustrated in FIG. 3, which is a cross sectional view taken along line 3—3 in FIG. 2 and which does not show the molten glass 20, the first jet stream 26 generally travels along a first jet stream originating flow path having an outermost linear projection 32 and the second jet stream 26' generally travels along a second jet stream originating flow path having an outermost linear projection 32'. Each jet stream port 30 is arranged such that its corresponding outermost linear projection 32, 32' intersects a perpendicularly oriented diametric line 34 of the batch melting chamber 18 at one of two points 36, 36'. The two points 36, 36' are spaced from an interior surface 19 of the batch melting chamber 18. Preferably, the distance between the points 36 and 36' is greater than about half of the interior diametric line of the batch melting chamber 18 and less than the full interior diametric line of the batch melting chamber 18. In this manner, the originating flow path of each jet stream 26, 26' is spaced from the interior surface 19 so as to minimize localized heating of the melter body 10 and to maximize the mixing functionality of the vortex flow pattern produced.

The apparatus for melting batch materials illustrated in FIGS. 1–4, and described above, includes two jet stream ports 30. However, it should be noted that as few as one or more than two jet stream ports 30 may be provided in the batch melting chamber 18. Specifically, the batch melting chamber 18 may comprise a plurality of jet stream ports 30 separated by a predetermined spacing along a direction parallel to the longitudinal melting chamber axis or the axis of rotation 29. Preferably, the injection ports 30 are arranged so that aerodynamic symmetry is achieved inside the chamber 18 to insure uniform temperature distribution and batch mixing. For example, the predetermined spacing may be less than about twice the interior diametric line of the batch melting chamber 18 and alternate ones of the plurality of jet stream ports 30 are preferably positioned on opposite sides of the batch melting chamber 18.

The molten glass delivery portion 16 comprises a restricted nozzle section 38 adapted to receive products of the fuel and oxidant reactions occurring within the vortex flow pattern 28. The path that the reaction products take as they pass through a bore 38a in the nozzle section 38 is indicated generally in FIG. 2 by the reaction product arrows 39. The interior diametric line of the restricted nozzle bore 38a is about 0.3 to 0.7 times the interior diametric line of the batch melting chamber 18. The restricted nozzle section 38 further includes a nozzle lip 40 in the form of a truncated cone extending in the direction of the batch melting chamber 18. The nozzle lip 40 encourages large-scale toroidal recirculation of products of combustion at high temperatures within the batch melting chamber 18. The paths of large-scale toroidal recirculation are illustrated generally in FIG. 2 by the directional arrows 42. The large-scale toroidal recirculation of high temperature products of combustion provide an additional mechanism for dynamic combustion stabilization in the batch melting chamber where the combustion reactions between the fuel and oxidant are quenched by the injection of glass batch materials. The nozzle lip 40 further minimizes local stagnant regions where batch material build-up may occur. The restricted nozzle section 38 also includes a cone shaped diverging section 43 which functions as a flow straightener for the products of reaction to reduce the potential that the products of reaction will follow a chaotic flow pattern as they exit the nozzle section 38. The cone shaped diverging section 43 is preferably designed with a full cone angle on the order of about 30° to about 120°. The reaction products are discharged by the nozzle section 38 into a conventional downstream glass production furnace 100 wherein the heat of the reaction products may be further utilized to heat molten glass. The downstream glass production furnace 100 may be associated with conventional fiber forming equipment.

Referring specifically to FIG. 2, the vortex flow pattern 28 has an axis of rotation 29 which lies in a plane defining a boundary between an upper melter body portion 72 and a lower melter body portion 74. The interior surface 19 of the batch melting chamber 18 is a continuous surface shaped to cause molten glass 20 thrown against the interior surface 19 of the batch melting chamber 18 by the centrifugal force generated by the vortex flow pattern 28 to flow, via gravitational forces, from the upper melter body portion 72 to the lower melter body portion 74. In this manner, molten glass 20 is collected in a first molten glass cavity 60. To encourage movement of the molten glass in the direction of the first molten glass cavity 60, the batch melting chamber 18, and consequently the boundary defining plane, may be inclined. In a particular trial run, approximately 200 pounds per hour of glass raw batch was introduced into the melter body 12 during a period of 15 hours and substantially all of the 3000 pounds of batch was melted into molten glass of good quality with no unmelted batch materials and with a seed count of 2213 seeds per cubic inch. It is contemplated by the present invention that the rate at which batch materials may be melted will vary depending upon the operating parameters of the melter body 10 and the type of batch materials to be melted.

Referring now to FIG. 5, where like elements are indicated by like reference numerals, an alternative embodiment of the present invention is illustrated. As is noted above, the batch melting chamber 18 has a longitudinal melting chamber axis 48. A first section 11a of the melter body 10' is inclined with respect to a second section 11b of the melter body 10' and a horizontal plane 50 by means of a pivoted mounting assembly 52 and an inclination adjusting member 53. The pivoted mounting assembly 52 and the inclination adjusting member 53 may be any conventional structure for performing the described functions. The first section 11a includes the batch injection portion 12, the batch melting portion 14, and a first portion 16a of the batch delivery portion 16'. The second section 11b includes a second portion 16b of the batch delivery portion 16'.

An exhaust port 54 is provided in the second portion 16b of the molten glass delivery portion 16' as a means for dispensing products of the oxidant and fuel reactions taking place within the melting chamber 18. An exhaust hood 56 is shown schematically in FIG. 5 to further illustrate the combustion product dispensing nature of the exhaust port 54. A sump 58 is positioned so as to physically confine debris falling through the exhaust port 54.

In the molten glass delivery portion 16', a submerged throat or passage 64 is operative to transfer molten glass from the first molten glass cavity 60 to a second molten glass cavity 62 provided in the second portion 16b of the batch delivery portion 16'. In this manner, molten glass is transferred from the melting chamber 18 to the second molten glass cavity 62 independent of the products of combustion, completing the separation of molten glass from the products of combustion. As a result, inclusion of gasses within the molten glass in the second cavity 62 is minimized. The first molten batch cavity 60 and the second molten batch cavity 62 are separated by a nozzle body portion 66. The level of the molten glass in the first molten glass cavity 60 will be slightly lower than the level of the molten glass in the second molten glass cavity 62 because of an increase in pressure caused by the injected jet streams 26,26' and the reactions within the melting chamber 18.

The second portion 16b of the molten glass delivery portion 16' further includes a molten glass level probe 44 which enables monitoring and control of the depth of the molten material in the second molten glass cavity 62. The level probe 44 may comprise any conventional fluid level probe, e.g., a back pressure probe, a laser transmitter probe, or an electromagnetic probe.

Where the molten glass is intended to be used in a fiber forming process, the second portion 16b of the delivery portion 16' further includes a conventional fiber forming bushing 46. The melter body 10' also includes pressure monitoring ports 68 coupled to respective differential pressure gauges (not shown) to enable monitoring and control of the interior pressure of the melter body 10'. Finally, the melter body 10' also includes thermocouples 70 positioned to monitor the temperature of the molten glass, the melter body, and/or the products of reaction.

The interior surfaces of the first and second sections 11a and 11b of the melter body 10' are defined by inner block layers 10a and 10e formed of high temperature refractory such as chromic oxide suitable for molten glass contact. Insulating structure is provided surrounding the inner block layers 10a, 10e and throughout the remainder of the melter body 10' as indicated in FIG. 5. Specifically, although a variety of insulating and structural materials may be utilized with the present invention, a first insulating material 10b comprises 2600° F. insulation fire bricks, a second insulating material 10c comprises 2300° F. insulation fire bricks, and a ceramic blanket 10d are provided.

Figure 7:
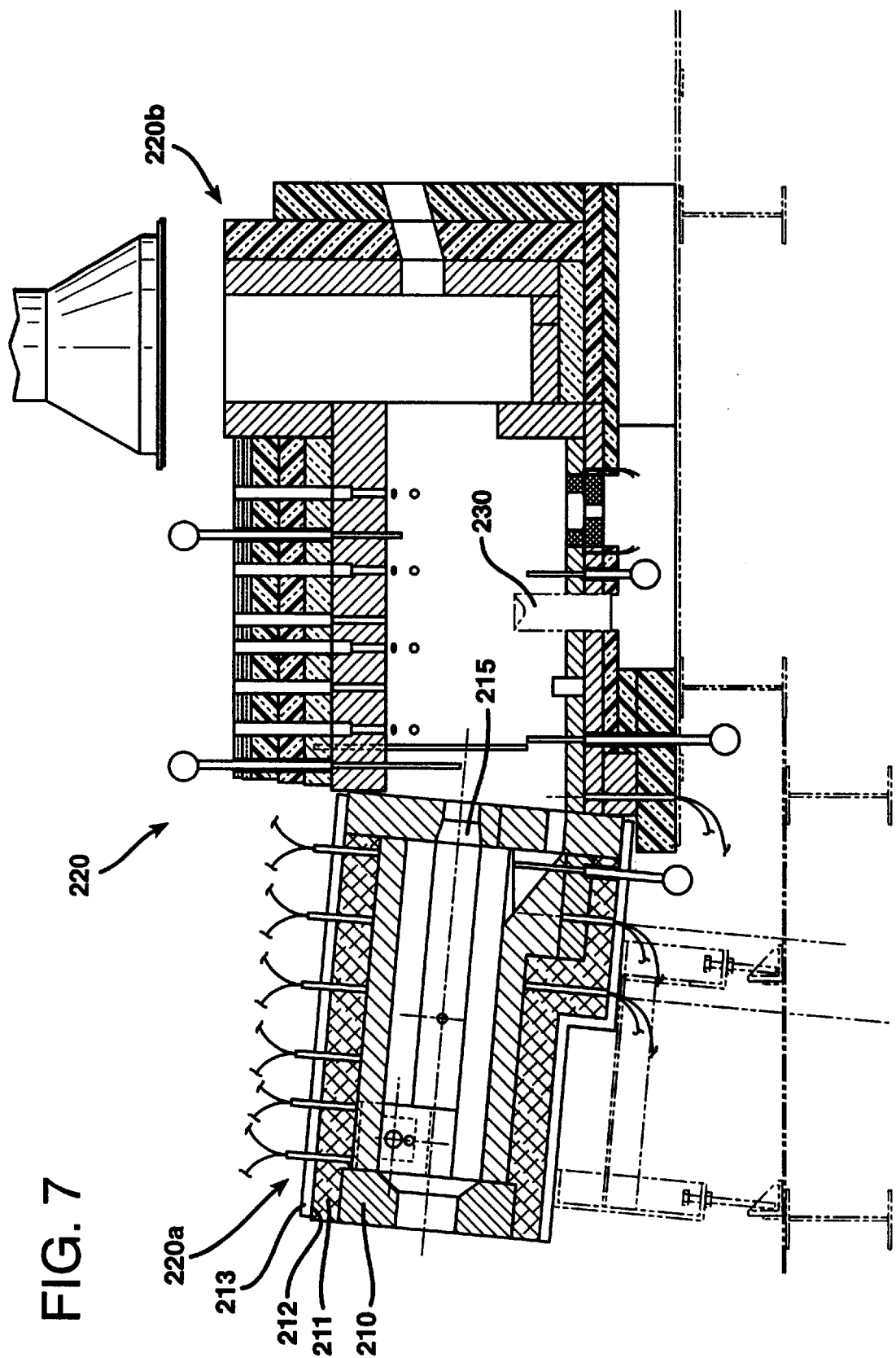
FIG. 7 is a cross sectional view of an apparatus for melting batch materials according to yet another embodiment of the present invention.

FIG. 7 illustrates yet another embodiment of the present invention. Reference is made to the embodiment of FIG. 5, wherein the structure in FIG. 7 not labeled with reference numerals is described in detail. Referring to FIG. 7, the interior surfaces of the first section 220a of the melter body 220 are defined by inner block layers 210 formed of chromic oxide high temperature refractory for glass contact. Castable refractory material 211, such as mullite, is provided for structural integrity and insulation. Further insulation 212 made of ceramic paper is provided for temperature and heat loss control. The insulation material 212 is backed by a water-cooled jacket 213. The restricted nozzle bore 215 adapted to receive the products of reaction is of a convergent cone design. The second section 220b of the melter body 220 is equipped with a standpipe exit port 230 as shown in FIG. 7. The standpipe 230 is made of alloy and functions as an additional means to maintain constant glass level in the second section 220b of the melter body 220 by forcing the glass level within the second section 220b to rise to the top of the standpipe 230 before any molten glass exits the second section 220b.

Figure 6A:
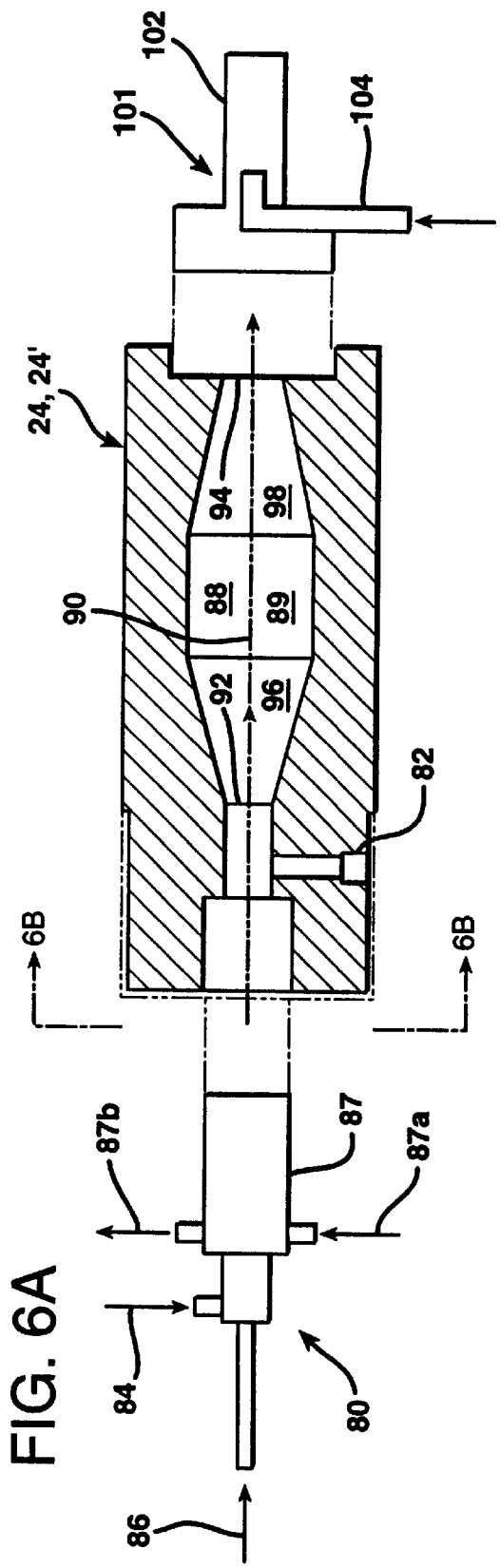
FIG. 6A is an exploded top plan view, partially in cross section and partially schematic, of a jet stream injection assembly according to the present invention.
Figure 6B:
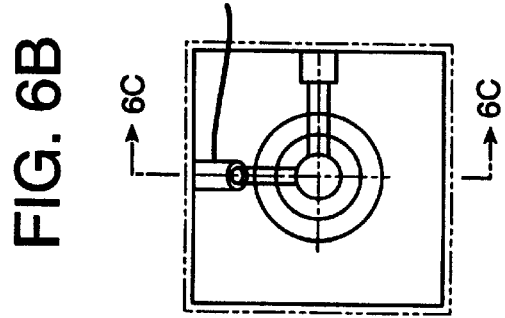
FIG. 6B is an end plan view taken along line 6B—6B of FIG. 6A.
Figure 6C:
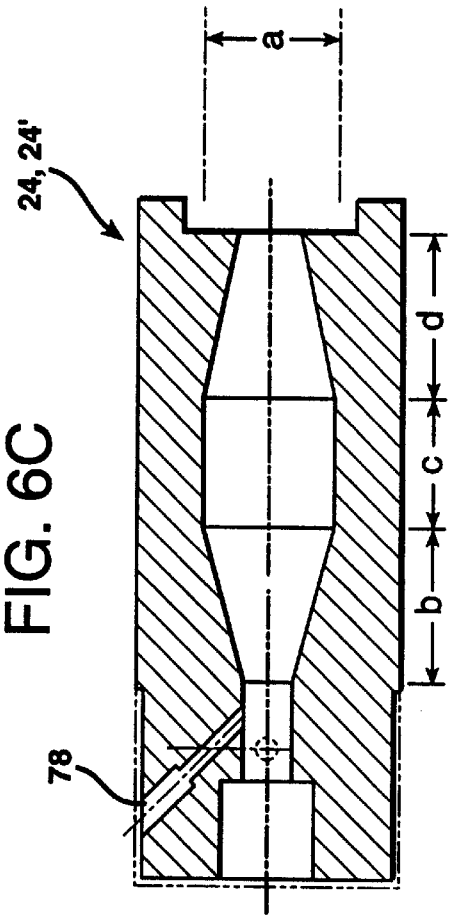
FIG. 6C is a side plan view taken along line 6C—6C of FIG. 6B.

Referring now to FIGS. 6A–6C, the specific components of the first and second jet stream injection assemblies 24, 24' are illustrated. An injection assembly burner 80 includes a primary oxidant supply 84 and a primary fuel supply 86 and, in combination with operation with an igniter 82, produces heated products of combustion by igniting an oxy-fuel distribution created by the primary oxidant supply 84 and the primary fuel supply 86. The primary oxidant supply 84 and the primary fuel supply 86 operate to introduce an excess of oxidant over the stoichiometric requirement for oxy-fuel firing. Because the primary fuel supply 86 introduces fuel along a central axis of the burner 80, the excess oxidant tends to be distributed adjacent the interior walls of the injection assembly burner 80. As a result, the excess oxidant keeps the walls of the burner 80 and the walls of downstream passages, described below, relatively cool. Further, as will be described in detail below, the excess oxygen is utilized in a downstream combustive reaction. The excess oxidant preferably comprises at least four times the amount of oxidant over the stoichiometric requirement for oxy-fuel firing. Where pure oxygen is introduced by the primary oxidant supply 84 and natural gas is introduced by the primary fuel supply 86, the oxygen flow rate is preferably from about 1000 to about 3000 standard cubic feet per hour (0.0078 and 0.023 $m^3$/sec) while the gas flow rate is preferably from about 100 to about 200 standard cubic feet per hour (0.00078 and 0.0016 $m^3$/sec). Specifically, to produce a jet stream having a temperature of approximately 2615° F. (1435° C.), the oxygen flow rate should be approximately 1400 standard cubic feet per hour (0.0101 $m^3$/sec) and the natural gas flow rate should be approximately 140 standard cubic feet per hour (0.00101 $m^3$/sec). Generally, an increase in the relative amount of natural gas provided increases the temperature of the jet stream while an increase in the relative amount of oxygen provided decreases the jet stream temperature. The injection assembly burner 80 also includes a water cooled jacket 87 fed and drained by an inlet water supply 87a and a water outlet 87b.

A combustion chamber 88 receives the combustion products produced by the injection assembly burner 80 and any excess oxidant and defines a combustion product flow path 90 extending from a combustion chamber inlet 92 to a combustion chamber outlet 94. The combustion chamber includes a divergent combustion chamber portion 96 positioned along the combustion product flow path 90 between the combustion chamber inlet 92 a straight combustion chamber portion 89, and a convergent combustion chamber portion 98 positioned along the combustion product flow path 90 between the straight combustion chamber portion 89 and the combustion chamber outlet 94.

A combustion product duct 101 is positioned to receive the combustion products and any excess oxidant and extends from the combustion chamber outlet 94. The divergent/convergent design of the combustion chamber 88 insures high combustion efficiency and produces an accelerated jet stream of the combustion products and the excess oxidant in the combustion product duct 101. Further, a fuel introduced by a secondary fuel supply inlet 104 positioned between the combustion chamber outlet 94 and the jet stream outlet 102 joins the jet stream. The jet stream including the secondary fuel, excess oxidant and products of combustion passes through a jet stream outlet 102 to form one of the jet streams 26, 26' illustrated in FIG. 2, which jet streams 26, 26' produce the vortex flow pattern 28 in the batch melting chamber 18. As noted previously, the secondary fuel and the excess oxidant are ignited in the batch melting chamber 18 to form laminar flamelets. The velocity of each jet stream 26, 26' is generally on the order of about 50 to about 300 ft/s (15.3 to 91.5 m/s) depending upon the particular design parameters of the jet stream injection assembly 24, 24'. The fuel is not limited to natural gas, as other gaseous, liquid, slurry, and solid fossil fuels may be used.

Referring to FIG. 6C, according to one embodiment of the present invention, the combustion chamber 88 is preferably designed with the following approximate dimensions: a=4" (10.16 cm); b=5" (12.7 cm); c=4" (10.16 cm); and d=5" (12.7 cm).

A combustion probe port or sensor port 78 is provided in each of the jet stream injection assemblies 24, 24' so as to permit monitoring of the oxy-fuel flame. For example, a UV sensor, such as the UV sensor commercially available from Honeywell, Inc., Golden Valley, Minn., may be provided in the combustion sensor port 78.

The injection assembly burner 80 provides a distribution of oxygen and natural gas for combustion. Preferably, the distribution of oxygen and natural gas is established such that approximately 10 parts of natural gas are introduced into the jet stream injection assembly 24, 24' by the injection assembly burner 80 and approximately 90 parts natural gas are introduced into the jet stream injection assembly 24, 24' by the secondary fuel supply inlet 104.

Having described the invention in detail and by reference to preferred embodiments thereof, it will be apparent that modifications and variations are possible without departing from the scope of the invention defined in the appended claims. For example, it is contemplated by the present invention that the melter of the present invention may be employed in other processes besides glass production, i.e., processes which involve conversation of solid and/or slurry feed materials into a molten fluid.

I claim:

1. An apparatus for melting materials comprising:
 a melter body having (i) a batch injection portion including a batch inlet port, (ii) a batch melting portion including a batch melting chamber adapted to receive batch materials from said batch injection portion, and (iii) a molten materials delivery portion including a molten materials outlet port; and
 at least one jet stream injection assembly operative to inject a jet stream into said batch melting chamber and arranged to produce a vortex flow pattern in said batch melting chamber wherein
 said molten materials delivery portion includes a first molten materials cavity, a second molten materials cavity, and a submerged throat operative to transfer molten materials from said first molten materials cavity to said second molten materials cavity, and
 said first molten materials cavity is separated from said second molten materials cavity by a nozzle body portion of a restricted nozzle section adapted to receive products of said reaction.

2. An apparatus as claimed in claim 1 wherein said batch injection portion comprises a conical batch injection chamber, and wherein said batch inlet port is positioned at generally the apex of said conical batch injection chamber.

3. An apparatus as claimed in claim 1 wherein said batch melting chamber comprises a cylindrical batch melting chamber having at least one jet stream port formed in said cylindrical batch melting chamber, said at least one jet stream port defining an entry point for said injected jet stream, wherein an outermost linear projection of an originating flow path of said injected jet stream intersects a perpendicularly oriented diametric line of said batch melting chamber at a portion of said perpendicularly oriented diametric line spaced from an interior surface of said batch melting chamber.

4. An apparatus as claimed in claim 1 wherein said batch melting chamber has a longitudinal melting chamber axis inclined with respect to a horizontal plane.

5. An apparatus as claimed in claim 1 wherein said batch melting chamber has a longitudinal melting chamber axis and comprises a plurality of jet stream ports separated by a predetermined spacing along a direction parallel to said longitudinal melting chamber axis.

6. An apparatus as claimed in claim 5 wherein said batch melting chamber is characterized by a melting chamber interior surface diametric line and wherein said predetermined spacing is less than about twice said interior surface diametric line.

7. An apparatus as claimed in claim 5 wherein alternate ones of said plurality of jet stream ports are positioned on opposite sides of said batch melting chamber.

8. An apparatus as claimed in claim 1 wherein said molten materials delivery portion of said melter body comprises a restricted nozzle section adapted to receive products of flamelet reactions within said vortex flow pattern.

9. An apparatus as claimed in claim 8 wherein said batch melting chamber is characterized by a melting chamber interior surface diametric line and wherein an interior diametric line of said restricted nozzle is about 0.3 to 0.7 times said interior surface diametric line.

10. An apparatus as claimed in claim 8 wherein said melter body includes an exhaust port located downstream from said restricted nozzle section and adapted to dispense products of said reaction.

11. An apparatus as claimed in claim 10 wherein said melter body includes a sump positioned so as to confine debris entering said melter body.

12. An apparatus as claimed in claim 1 wherein said molten materials delivery portion includes a molten materials level control device.

13. An apparatus as claimed in claim 12 wherein said level control device comprises a standpipe.

14. An apparatus as claimed in claim 1 wherein said delivery portion includes a fiber forming bushing.

15. An apparatus as claimed in claim 1 wherein said melter body includes at least one interior pressure monitoring probe.

16. An apparatus as claimed in claim 1 wherein said melter body includes at least one thermocouple positioned to monitor one of said molten materials temperature, said melter body temperature, and a reaction product temperature.

17. An apparatus as claimed in claim 1 wherein said molten materials comprise molten glass.

* * * * *